United States Patent [19]

Ohmure et al.

[11] Patent Number: 4,985,168
[45] Date of Patent: Jan. 15, 1991

[54] WORKING FLUIDS

[75] Inventors: Yukio Ohmure, Takatsuki; Hiroshi Kashiwagi, Settsu; Katsuki Fujiwara, Suita; Tatsumi Tsuchiya, Neyagawa; Hirokazu Aoyama, Takatsuki, all of Japan

[73] Assignee: Daikin Industries, Ltd., Osaka, Japan

[21] Appl. No.: 515,732

[22] Filed: Apr. 27, 1990

[30] Foreign Application Priority Data

Apr. 27, 1989 [JP] Japan ................................ 64-111276
May 24, 1989 [JP] Japan ................................ 64-132474
May 14, 1989 [JP] Japan ................................ 64-132475

[51] Int. Cl.$^5$ .............................................. C09K 5/04
[52] U.S. Cl. ....................................... 252/67; 62/114
[58] Field of Search ............................ 252/67; 62/114

[56] References Cited

U.S. PATENT DOCUMENTS 3,377,287  4/1968  Kvalnes et al. ................... 252/67
3,804,769  4/1974  Lomas et al. ................. 252/DIG. 9
4,057,973  11/1977  Murphy et al. ................... 252/67
4,687,588  8/1987  McLinden et al. ............... 252/67

FOREIGN PATENT DOCUMENTS 0072308  2/1983  European Pat. Off. ..
1108292  4/1989  Japan .
1-123886  5/1989  Japan .

Primary Examiner—Paul Lieberman
Assistant Examiner—Christine A. Skane
Attorney, Agent, or Firm—Larson and Taylor

[57] ABSTRACT

The present invention provides:

(1) a working fluid comprising at least one of 3-chloro-1,1,1,2,2-pentafluoropropane and 1-chloro-1,1,3,3,3-pentafluoropropane, (2) a working fluid comprising (1) at least one of 3-chloro-1,1,1,2,2-pentafluoropropane and 1-chloro-1,1,3,3,3-pentafluoropropane and (2) at least one of 2,2-dichloro-1,1,1-trifluoroethyane, 1,2-dichloro-1,1,2-trifluoroethane and 1,1-dichloro-1,2,2-trifluoroethane, and (3) a working fluid comprising (1) at least one of 3-chloro-1,1,1,2,2-pentafluoropropane and 1-chloro-1,1,3,3,3-pentafluoropropane and (2) 1,1-dichloro-1-fluoroethane.

7 Claims, No Drawings

WORKING FLUIDS

This invention relates to a working fluid or refrigerant for a refrigerator, heat pump, etc (hereinafter simply referred to as a working fluid unless otherwise required).

Working fluids heretofore known include chlorofluorocarbons, hydrochlorofluorocarbons, hydrofluorocarbons, azeotropic compositions thereof and like compositions. Among these working fluids, trichlorofluoromethane (R-11), dichlorodifluoromethane (R-12), etc. are widely used for refrigerators. In recent years, however, it has been suggested that fully halogenated chlorofluorocarbons released into the atmosphere would deplete the stratospheric ozone layer, thereby inflicting a serious adverse influence on the ecosystem including humans on the earth. A worldwide agreement, "The Montreal Protocol," signed in September 1987, calls for a restriction of consumption and production of the major ozone-depleting CFCs. Among the CFCs to be controlled for the restriction is R-11. With the spread of refrigerators and air-conditioning systems, the control over the use and production of CFCs enjoying an annually increasing demand greatly affects our residential environment and the current social framework as a whole. In consequence, there is an urgent demand for development of novel refrigerants with a high refrigerating performance, particularly a high coefficient of performance, which can be substituted for R-11.

2,2-Dichloro-1,1,1-trifluoroethane (R-123) is a promising candidate substitute for R-11, but has a low refrigerating performance in comparison with R-11. In addition, R-123 has a high solvency power on high molecular materials. When used in a conventional refrigerator, R-123 attacks gradually packings made of polymers, covering materials of enamel-coated wires used in coils and may stop the normal function of refrigerator. If R-123 is to be used as a substitute for R-11, new materials chemically fully resistant to R-123 must be developed.

Several other compounds are proposed as substitute for R-11 including 1,1-dichloro-1-fluoroethane (R-141b), 1-chloro-1,1,3,3,3-pentafluoropropane (R-235fa), 3-chloro-1,1,1,2,2-pentafluoropropane (R-235cb), etc. However, they are not satisfactory as working fluids: R-141b is inflammable and involves a fire hazard when leaked out of the refrigerating system; R-235fa and R-235cb are low in refrigerating performance such as heating capacity, cooling capacity, coefficient of performance, etc.

We conducted extensive research to develop novel working fluids which have a high refrigerating performance and which, if released into the atmosphere, would exert little influence on the ozone layer. Our research revealed that when a certain class of CFC compound is used singly or mixed with other CFC or CFCs, a working fluid can be obtained which can exhibit a high coefficient of performance.

The present invention provides a working fluid comprising at least one of 3-chloro-1,1,1,2,2-pentafluoropropane and 1-chloro-1,1,3,3,3-pentafluoropropane (hereinafter simply referred to as Working Fluid I).

The present invention also provides a working fluid comprising (1) at least one of 3-chloro-1,1,1,2,2-pentafluoropropane and 1-chloro-1,1,3,3,3-pentafluoropropane, and (2) at least one of 2,2-dichloro-1,1,1-trifluoroethane, 1,2-dichloro-1,1,2-trifluoroethane and 1,1-dichloro-1,2,2-trifluoroethane (hereinafter simply referred to as Working Fluid II).

The present invention further provides a working fluid comprising (1) at least one of 3-chloro-1,1,1,2,2-pentafluoropropane and 1-chloro-1,1,3,3,3-pentafluoropropane, and (2) 1,1-dichloro-1-fluoroethane (hereinafter simply referred to as Working Fluid III).

Each of the working fluids of the present invention will be described below in more detail.

I. Working Fluid I

Working Fluid I of the invention comprises 3-chloro-1,1,1,2,2-pentafluoropropane (R-235cb: boiling point=27° C.) or 1-chloro-1,1,3,3,3-pentafluoropropane (R-235fa: boiling point=28° C.) or a mixture of R-235cb and R-235fa.

When a mixture of R-235cb and R-235fa is used, it can be in any mixing ratio of two components.

Working Fluid I may contain a stabilizer which will improve chemical stability under severe conditions. Examples of stabilizers are given below.

Epoxides such as propylene oxide, 1,2-butylene oxide, glycidol, etc.

Phosphites such as dimethylphosphite, diisopropylphosphite, diphenylphosphite, etc.

Thiophosphites such as trilauryltrithiophosphite, etc.

Phosphinsulfides such as triphenoxyphosphinsulfide, trimethylphosphinsulfide, etc.

Boron compounds such as boric acid, triethyl borate, triphenyl borate, phenylboronic acid, diphenylboric acid, etc.

Phenols such as 2,6-di-tert.butyl-p-cresol, etc.

Nitroalkanes such as nitromethane, nitroethane, etc.

Acrylic acid esters such as methyl acrylate, ethyl acrylate, etc.

Other stabilizers such as dioxane, tert.butanol, pentaerythritol, p-isopropenyl toluene, etc.

These stabilizers are usable singly or at least two of them can be used in mixture. Although variable with the kind of stabilizer, the amount of stabilizer is usually about 0.01 to about 5% by weight of the working fluid.

II. Working Fluid II

Working Fluid II of the invention comprises (1) at least one of R-235cb and R-235fa and (2) at least one of 2,2-dichloro-1,1,1-trifluoroethane (R-123), 1,2-dichloro-1,1,2-trifluoroethane (R-123a) and 1,1-dichloro-1,2,2-trifluoroethane (R-123b). Working Fluid II usually comprises about 99 to about 20% by weight of the component (1) and about 1 to about 80% by weight of the component (2), preferably about 99 to about 60% by weight of the component (1) and about 1 to about 40% by weight of the component (2). If the amount of the component (1) exceeds 99% by weight, the coefficiency of performance would not be satisfactorily improved. When the amount of the component (1) is less than 20% by weight, high molecular materials used in refrigerator or heat pump will be affected and the function of system would be impaired.

The best results would be attained when a working fluid consisting of R-235cb and R-123 is used.

Stabilizers as indicated above may be incorporated into Working Fluid II in a similar amount as in Working Fluid I.

III. Working Fluid III

Working Fluid III of the invention comprises (1) at least one of R-235cb and R-235fa and (2) 1,1-dichloro-1-fluoroethane (R-141b). Working Fluid III comprises usually about 99 to about 35% by weight of the component (1) and about 1 to about 65% by weight of the component (2), preferably about 99 to about 45% by weight of the component (1) and about 1 to about 55% by weight of the component (2). When the amount of the component (1) is more than 99% by weight, the coefficient of performance would not be satisfactorily improved. When the amount of the component (1) is less than 35% by weight, the mixture shows higher inflammability and cannot be a practical working fluid. Working Fluid III consisting of about 99 to about 45% by weight of the component (1) and about 1 to about 55% by weight is preferred because it is nonflammable.

The best combination as a working fluid is achieved when a mixture of R-235cb and R-141b is used.

Stabilizers as shown above may be incorporated into Working Fluid III in a similar amount as in Working Fluid I.

The compounds used in the invention are relatively easily decomposed before they reach the stratospheric ozone layer and hardly cause the destruction of the ozone layer.

Since the working fluids of the invention are low in dissolving ability of high polymers, existing refrigerating systems can employ the working fluid without modifying or changing the materials of parts, etc.

The working fluids of the invention are safe to use because they are nonflammable or hardly inflammable.

EXAMPLES 1 to 3

A one-horse power compressor was operated using R-235cb as refrigerant under the conditions shown below:

(I) Condensing temperature (°C.) of R-235cb in condensor; as indicated in Table 1 below.

(II) Evaporating temperature (°C.) of R-235cb in evaporator; as indicated in Table 1 below.

(III) Subcooling temperature in condensor = 5° C.

Table 1 shows evaporation pressure, condensation pressure, cooling capacity and coefficient of performance.

TABLE 1

| Example | Evaporating temperature (°C.) | Condensing temperature (°C.) | Evaporating pressure (kg/cm$^2$) | Condensing pressure (kg/cm$^2$) | Cooling capacity (kcal/m$^3$) | Coefficient of performance |
|---|---|---|---|---|---|---|
| 1 | −15 | 30 | 0.1 | 1.0 | 33.9 | 4.94 |
| 2 | 5 | 40 | 0.4 | 1.5 | 87.0 | 7.19 |
| 3 | 50 | 100 | 2.0 | 7.5 | 374 (Heating capacity) | 6.18 |

EXAMPLE 4

Using each of 4 working fluids indicated in Table 2 below, the influence on plastics (weight increase by swelling of the materials) was inspected.

Immediately after a test piece of plastics (5 mm × 50 mm × 2 mm) was immersed and kept in a working fluid at 50° C. for 1 hour, the test piece was weighed to find the weight increase. The results are given in Table 2 below.

The plastics used were as follows.

(a) . . . polyvinyl chloride
(b) . . . acrylonitrile-butadiene-styrene copolymer
(c) . . . polycarbonate
(d) . . . polypropylene

TABLE 2

| Working fluid | Weight increase (%)[*] | | | |
| | (a) | (b) | (c) | (d) |
|---|---|---|---|---|
| R-235cb | A | A | A | A |
| R-235fa | A | A | A | A |
| R-123 | B | C | C | C |
| R-141b | B | C | C | B |

[*]A: Increase of less than 3%
B: Increase of 3% to 5%
C: Increase of more than 5%

The results in Table 2 show that Working Fluids I of the Invention are low in the ability to dissolve plastics.

EXAMPLES 5 to 9

The procedure of Example 1 was repeated using the mixtures of R-235cb and R-123 in place of R-235cb.

The results are given in Table 3 below.

TABLE 3

| Ex. | Ratio R-235cb/R-123 | Cooling capacity (kcal/m$^3$) | Coefficient of performance |
|---|---|---|---|
| 5 | 95/5 | 34.1 | 4.94 |
| 6 | 80/20 | 34.8 | 4.96 |
| 7 | 60/40 | 35.9 | 4.98 |
| 8 | 40/60 | 37.2 | 5.01 |
| 9 | 20/80 | 38.7 | 5.06 |

EXAMPLES 10 to 14

A one-horse power compressor was operated using a mixture of R-235cb and R-123 as working fluid under the following conditions.

(I) Condensing temperature of working fluid in condensor = 40° C.

(II) Evaporating temperature of working fluid in evaporator = 5° C.

(III) Subcooling temperature in condensor = 5° C.

Table 4 indicates the results.

TABLE 4

| Ex. | Ratio R-235cb/R-123 | Cooling capacity (kcal/m$^3$) | Coefficient of performance |
|---|---|---|---|
| 10 | 95/5 | 87.4 | 7.19 |
| 11 | 80/20 | 88.5 | 7.19 |
| 12 | 60/40 | 90.3 | 7.20 |
| 13 | 40/60 | 92.4 | 7.23 |
| 14 | 20/80 | 94.9 | 7.26 |

EXAMPLES 15 to 19

A one-horse power compressor was operated using a mixture of R-235cb and R-123 as working fluid under the following conditions.

(I) Condensing temperature of working fluid in condensor=100° C.

(II) Evaporating temperature of working fluid in evaporator=50° C.

(III) Subcooling temperature in condensor=5° C.

Table 5 indicates the results.

TABLE 5

| Ratio R-235cb/R-123 | Cooling capacity (kcal/m³) | Coefficiency of performance |
|---|---|---|
| Ex. | | |
| 15    95/5 | 374 | 6.19 |
| 16    80/20 | 378 | 6.19 |
| 17    60/40 | 384 | 6.21 |
| 18    40/60 | 391 | 6.25 |
| 19    20/80 | 400 | 6.29 |

EXAMPLES 20

Using each of 5 working fluids indicated in Table 6, the influence of working fluid on plastics was inspected in a similar manner as in Example 4.

(a) ... polyester
(b) ... bisphenol A-epoxypolymer
(c) ... polyamide-imide

The results are given in Table 6 below.

TABLE 6

| Working fluid | Weight increase (%) | | |
|---|---|---|---|
| R-235cb/R-123 | (a) | (b) | (c) |
| 95/5 | A | A | A |
| 80/20 | A | A | A |
| 60/40 | A | A | A |
| 40/60 | A | A | A |
| 0/100 | B | C | A |

The results in Table 6 show that Working Fluids II of the Invention hardly affect plastics.

EXAMPLES 21 to 24

The procedure of Example 1 was repeated using the mixtures of R-235cb and R-141b in place of R-235cb. The results are given in Table 7 below.

TABLE 7

| Ratio R-235cb/R-141b | Cooling capacity (kcal/m³) | Coefficiency of performance |
|---|---|---|
| Ex. | | |
| 21    95/5 | 33.8 | 4.95 |
| 22    80/20 | 33.4 | 4.98 |
| 23    60/40 | 33.1 | 5.03 |
| 24    40/60 | 33.0 | 5.09 |

Examples 25 to 28

The procedure of Example 10 was repeated using the mixtures of R-235cb and R-141b in place of R-235cb and R-123.

The results are indicated in Table 8.

TABLE 8

| Ratio R-235cb/R-141b | Cooling capacity (kcal/m³) | Coefficiency of performance |
|---|---|---|
| Ex. | | |
| 25    95/5 | 86.5 | 7.19 |
| 26    80/20 | 85.1 | 7.22 |
| 27    60/40 | 83.6 | 7.27 |
| 28    40/60 | 82.3 | 7.31 |

EXAMPLES 29 to 32

The procedure of Example 15 was repeated using the mixture of R-235cb and R-141b in place of the mixture of R-235cb and R-123.

The results are shown in Table 9 below.

TABLE 9

| Ratio R-235cb/R-141b | Cooling capacity (kcal/m³) | Coefficiency of performance |
|---|---|---|
| Ex. | | |
| 29    95/5 | 372 | 6.20 |
| 30    80/20 | 368 | 6.26 |
| 31    60/40 | 364 | 6.32 |
| 32    40/60 | 360 | 6.38 |

We claim:

1. A working fluid comprising 3-chloro-1,1,1,2,2-pentafluoropropane and 1-chloro-1,1,3,3,3-pentafluoropropane.

2. A working fluid comprising (1) at least one of 3-chloro-1,1,1,2,2-pentafluoropropane and 1-chloro-1,1,3,3,3-pentafluoropropane and (2) at least one of 2,2-dichloro-1,1,1-trifluoroethane, 1,2-dichloro-1,1,2-trifluoroethane and 1,1-dichloro-1,2,2-trifluoroethane.

3. A working fluid according to claim 2 which comprises about 99 to about 20% by weight of at least one of components (1) and about 1 to about 80% by weight of at least one of components (2).

4. A working fluid according to claim 3 which comprises about 99 to about 60% by weight of at least one of components (1) and about 1 to about 40% by weight of component (2).

5. A working fluid comprising (1) at least one of 3-chloro-1,1,1,2,2-pentafluoropropane and 1-chloro-1,1,3,3,3-pentafluoropropane and (2) 1,1-dichloro-1-fluoroethane.

6. A working fluid according to claim 5 which comprises about 99 to about 35% by weight of at least one of components (1) and about 1 to about 65% by weight of component (2).

7. A working fluid according to claim 6 which comprises about 99 to 45% by weight of at least one of components (1) and about 1 to 55% by weight of component (2).

* * * * *